C. F. MILLER.
DISK GRAIN DRILL.
APPLICATION FILED NOV. 29, 1916.
1,234,372.
Patented July 24, 1917.
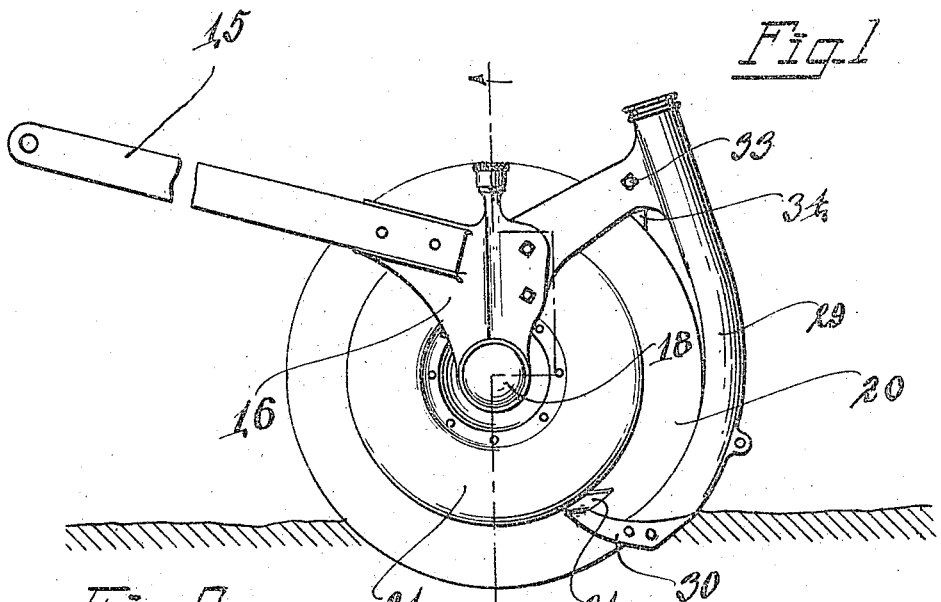
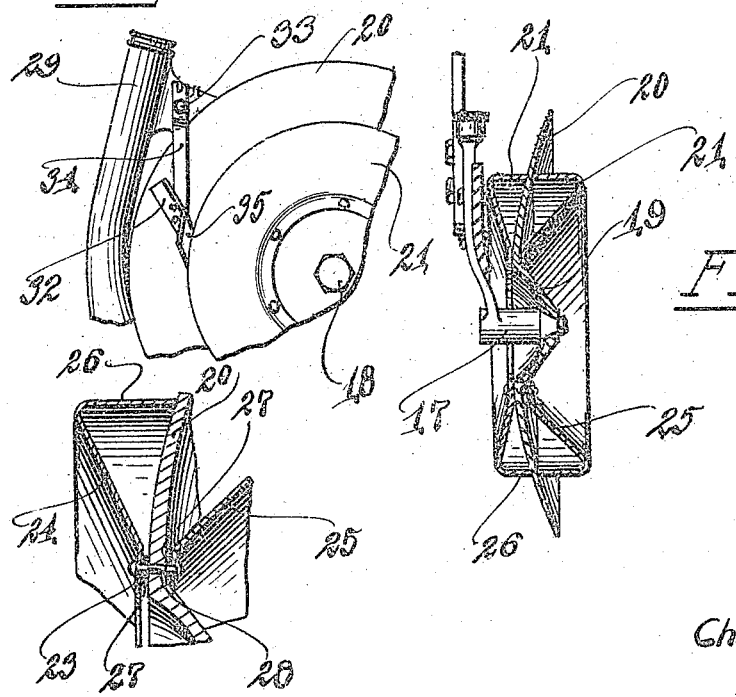
Inventor
Charles F. Miller
By Herbert E. Smith
Attorney

UNITED STATES PATENT OFFICE.

CHARLES F. MILLER, OF DEEPCREEK, WASHINGTON.

DISK GRAIN-DRILL.

1,234,372.

Specification of Letters Patent.

Patented July 24, 1917.

Application filed November 29, 1916. Serial No. 134,103.

*To all whom it may concern:*

Be it known that I, CHARLES F. MILLER, a citizen of the United States, residing at Deepcreek, in the county of Spokane and State of Washington, have invented certain new and useful Improvements in Disk Grain-Drills, of which the following is a specification.

My invention relates to improvements in grain drills and especially to that type of grain drill adapted to use disk furrow openers.

The object of my invention resides in providing a disk grain drill with a supporting or regulating means attached to the disk of the drill for the purpose of limiting the depth the drill may enter the ground, and to provide a means for depositing the seed at an even depth below the surface, no matter what the contour of the ground or how rough or uneven.

A further object of my invention resides in providing an inexpensive and thoroughly practical device embodying certain novel features of construction which may be readily installed upon the average disk grain drill with very little labor and without the necessity for extensive mechanical alterations.

I have shown in the accompanying drawings a construction especially adapted to provide for the even planting of the seed at a predetermined depth and by this arrangement is provided a means whereby each individual furrow opener or disk will follow the ground contour independent of any other disk or furrow opener and that will be governed by disk flanges rolling upon the surface of the ground to limit the depth of planting.

The present day seeders of which there are many varieties, make no attempt to plant each individual row to a fixed depth, but assume that the average field is level and that a slight difference in the depth of planting is not material. The result is, however, that in fields which are especially uneven a furrow opener may enter the ground in some cases at a depth of four or five inches, while other plantings with the same seeder will be at a depth of several inches and again other seed may be planted entirely upon the surface of the ground, causing a loss in both cases, that is where the seed is planted on the ground and where the seed is planted at too great a depth. In either case no crop will result and a great loss is caused by this wastage and by the diminished grain crop at harvest time.

In the accompanying drawings:—

Figure 1 is a side view of the drill in elevation.

Fig. 2 is a perpendicular cross section through the center of the disk.

Fig. 3 is an enlarged fragmentary view taken through the disk and showing the means of connecting the disk flanges to the disk proper.

Fig. 4 is a fragmentary view of Fig. 1 taken from the opposite side.

The drawings, in which like reference characters indicate like parts in the several views, will be hereinafter more specifically referred to. Adapted to be suspended from the frame of a grain drill are a plurality of disk furrow openers 14 pivoted to the frame at the front thereof and being attached by means of a short tongue or truck arm 15. To this arm is also fixed the disk supporting casting 16 provided with a disk journal 17 through which a shaft 18 passes and is attached rigidly to the disk plate 19 in any suitable manner. The disk plate 19 is riveted to the disk 20 at suitable points and just outside the circumference of 19 are provided a series of rivets 22 which serve to secure the disk flanges 21, which are the special features of my invention. These disk flanges are attached through the rivet holes 23 and from this point of attachment are bent outwardly as shown at 24 and 25 away from the disk and toward the circumference thereof until their outer edge stands several inches from the face of the disk. The flanges then turn inwardly at an acute angle as at 26, and on the plane of the axle or supporting shaft 18 until they touch the disk on either side. The joining with the disk is preferred to be as close as possible, but as it is realized that in many cases it will be impossible to make this joining of the flange to the disk perfectly dust tight, it is intended in mounting the flanges upon the disks that washers 27 be placed under the flange rivet holes which support the flanges to the disk 20 and the rivets 28 passing through the disks will also pass through the washers to maintain the disk flange at the point of attachment slightly distant from the disk to allow any soil that may pass under the flange at the juncture of the flange with the disk to readily pass out from the recess or underside of the flange 21, so as not to unduly weight the disk truck and cause the truck, by reason of such weight, to sink into the ground to an abnormal depth.

It is usually desired that the inturned portion of the flange 26 shall be several inches from the extreme outer circumference of the disk 20 so that when the flange portion 26 is rolled upon the ground the disk will have entered the ground to a depth of several inches and that the disk boot 29 through which the seed passes will be able to deposit the seed at that depth. The toe piece 30 is attached to the boot 29 and closely follows the contour of the disk and is provided with a knife edge to cut off any clay, soil or mud that attaches itself to the disk.

The outer end 31 of the said toe piece 30 is outturned to engage with the periphery of the wheel flange to keep said flange free from any mud or soil that may stick thereto. Engaging the convex side of the disk is a scraper member 32 attached to the boot at 33 and having flexible attachment means 34 to keep the scraper in contact with the disk. The scraper 32 is provided with an outturned end 35 for engaging the periphery of the flange 21 attached to that side of the disk. The edge of the scraper adjacent the disk and the wheel flange 21 is provided with a knife edge so that at all times the disk and the flange may be kept free of soil or such substance that may adhere thereto.

The added weight imposed upon the disk by reason of the attached wheel flanges are intended to cause the disk to more readily enter hard ground or clay ground so that seeding to the proper depth will be insured. In soft ground the special function of the flanges is to roll upon the surface of the ground to prevent the disk from making a seed furrow of a depth greater than the limit or space between the periphery of the flanges and the periphery of the disk. An added advantage enters into this construction in that rolling contact of the flanges upon the ground will cause small clods and soil lumps to be broken up and pulverized so that the seed may be readily covered and thoroughly protected by mulch that will not retard or prevent the sprouts from coming to the surface.

While I have specifically described the elements best adapted to perform the function set forth, it is obvious that various changes in the form, proportions and the details of construction may be resorted to without departing from the spirit of the invention as hereinafter claimed, and I want it understood that I distinctly reserve the right to make such changes without waiving the protection sought by this application for patent.

I claim:—

1. In a rotary disk furrower, a disk having a concave and a convex face, annular flange members secured to opposite faces of the disk, each member being formed to extend at an angle to the opposed face of the disk and toward the rim of the disk, and being inturned to engage the disk face and provide an annular tread portion of less diameter than the diameter of the disk.

2. In a rotary disk furrower, a disk, an annular flange member attached to each face of the disk, said flanges each being formed with an inner peripheral edge, an outer peripheral edge, an annular tread portion of less circumference than the disk, and a web portion, the latter extending at an angle to the opposed face of the disk.

3. In a rotary disk furrower, a disk, an annular flange member attached to each face of the disk, said flanges each being formed with an inner peripheral edge secured in spaced relation to the disk face, an outer peripheral edge, an annular tread portion of less circumference than the disk, and a web portion, the latter extending at an angle to the opposed face of the disk.

4. In a rotary disk furrower, a disk having a centrally cupped hub portion, a concave and a convex face, annular flange members secured to opposite faces of the disk and surrounding said hub portion, each member being formed to extend at an angle to the opposed disk face, and being inturned to engage the disk face and provide an annular tread portion of less diameter than the diameter of the disk.

5. In a disk implement, the combination with a disk, of an annular tread portion projecting from one face of the same and of less diameter than the rim of the disk, a grain boot depending in close relation with the rim of the disk its delivery end being adapted to extend within a furrow made by said disk, and a scraper mounted upon the lower end of said boot and having its edge portion engaging the projecting portion of the disk and of said tread portion.

In testimony whereof I affix my signature.

CHARLES F. MILLER.

Copies of this patent may be obtained for five cents each, by addressing the "Commissioner of Patents, Washington, D. C."